United States Patent [19]

Andersson

[11] 4,266,661
[45] May 12, 1981

[54] CONVEYOR BELT ARRANGEMENT HAVING AN ENDLESS PATH

[76] Inventor: Curt E. Andersson, Björkhagen, Toltorp, 641 00 Katrineholm, Sweden

[21] Appl. No.: 74,781

[22] Filed: Sep. 12, 1979

[30] Foreign Application Priority Data

Sep. 15, 1978 [SE] Sweden ............................... 7809708

[51] Int. Cl.³ .............................................. B65G 17/10
[52] U.S. Cl. ................................... 198/822; 198/844; 308/238
[58] Field of Search ........................ 198/822, 850, 844; 403/116, 61, 388, 408; 308/237 R, 238

[56] References Cited

U.S. PATENT DOCUMENTS 2,280,141  4/1942  Andrews et al. ................. 308/237 R

FOREIGN PATENT DOCUMENTS

| 476776 | 9/1951 | Canada ................................... 198/822 |
| 24166 | 5/1956 | Fed. Rep. of Germany ........... 198/822 |
| 1014928 | 8/1957 | Fed. Rep. of Germany ........... 198/822 |
| 1267600 | 5/1968 | Fed. Rep. of Germany ........... 198/822 |

1131487  2/1957  France ..................................... 198/822

*Primary Examiner*—Robert B. Reeves
*Assistant Examiner*—Douglas D. Watts
*Attorney, Agent, or Firm*—Burns, Doane, Swecker & Mathis

[57] ABSTRACT

A conveyor belt comprising a plurality of links whose mutually opposite end parts are pivotally connected to the end parts of respective mutually adjacent links. The links together form, in this way, an endless belt, which is normally driven and guided by drive wheels and guide wheels or rollers. Each link has at one end part thereof a first part-cylindrical surface and at the other end part thereof a second part-cylindrical surface. The diameter of one part-cylindrical surface shall coincide with the diameter of the other part-cylindrical surface. The pivot centers of the links shall lie on the respective centers of the part-cylindrical surfaces. A wear-resistant insert can be placed between the one end part of one link and the end part of an adjacent link. Arranged on the mutually opposite sides of the links is one or two mutually parallel side walls having two holes for cooperation with a respective link.

9 Claims, 8 Drawing Figures

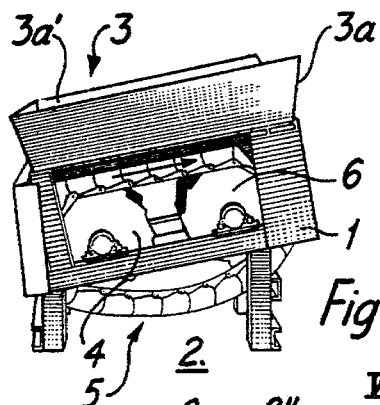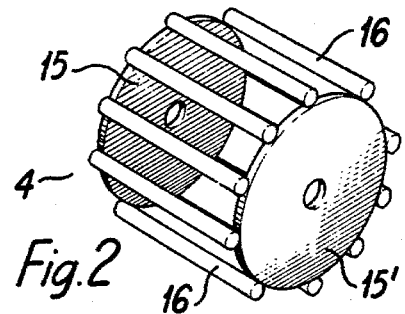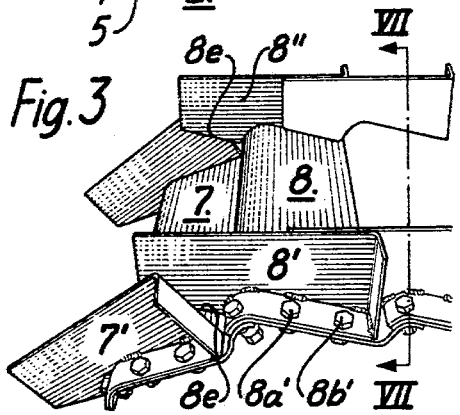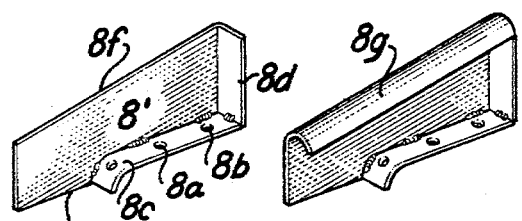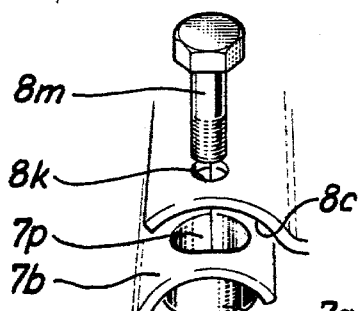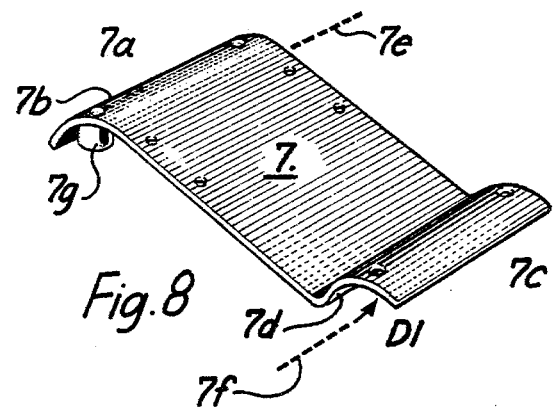

CONVEYOR BELT ARRANGEMENT HAVING AN ENDLESS PATH

FIELD OF THE INVENTION

The present invention relates to a conveyor belt, and more particularly, although not exclusively to a conveyor belt of the kind comprising a plurality of links whose mutually remote end parts are pivotally attached to the end parts of adjacent links, said links forming therewith an endless belt which is normally guided and carried by drive rollers and belt-guiding rollers or wheels.

Conveyor belts of this kind are particularly intended for conveying granular goods, particulate goods. Such conveyors, however, may also be used for conveying lump goods. Thus, the conveyor belts can be used to move, inter alia, sand, wood-chips, waste and wood cuts from timber yards.

BACKGROUND OF THE INVENTION

Many conveyor belts are known to the art which have been designed in a manner such as to enable them to be adapted for the transport of different goods. For example, there is known a conveyor-belt comprising a rubber or plastic-coated belt for transporting granular or particulate material. Such a conveyor belt is limited with respect to the angle of inclination of the belt, owing to the inherent angle of repose of said material.

To enable material to be transported on such a belt at an angle greater than the repose angle, it has been proposed that the belt be provided with a plurality of preferably uniformally spaced ridges or transverse ribs.

Also known is a conveyor belt which comprises a plurality of links where the mutually opposite end parts of respective links are pivotally connected to respective end parts of adjacent links, said links forming an endless belt which is guided by drive wheels and guide-rollers or guide-wheels. One advantage with conveyor belts of this latter kind is that they are relatively resistant to wear by the goods transported thereon; another advantage is that the links can be provided with side-boards such as to permit the volume of material per unit of time to be increased.

SUMMARY OF THE INVENTION

Technical Drawbacks

One disadvantage with the last described conveyor belt, i.e. a conveyor belt comprising a plurality of links whose end parts are pivotally connected to respective end parts of adjacent links to form an endless belt which is normally driven and guided by drive wheels and guide rollers or guide wheels, is that the pivotable attachment between the respective links is subject to wear, causing play to occur at the pivot shaft. This wear results in the links being displaced away from one another, so that an opening is formed between the end-parts of mutually adjacent links, through which opening material carried by the conveyor can pass, particularly when said material is granular. Thus, the goods being conveyed will permeate or fall through the belt to a greater or less extent as the pivotable attachment becomes more and more worn.

It is also difficult to produce a conveyor belt comprising a plurality of links cheaply and to render the belt self-supporting.

A further problem with a conveyor belt of this kind is one of constructing the links in a manner such that the angle of inclination of the belt is able to exceed the repose angle of the material without it being necessary to undertake complicated constructive measures. Links which must be constructed in accordance with complicated methods result in expensive conveyor belts, and in order to keep costs down it is desirable to construct the links in a manner which will enable the belt to be produced relatively cheaply.

Preferably each link shall be resistant to bending and, when necessary, shall be capable of being exchanged for another.

Finally, it is desirable that the conveyor belt is self-supporting, thereby avoiding the provision of expensive frame-constructions.

Solution to the problems

The present invention provides a conveyor belt comprising a plurality of links whose mutually opposite end parts are pivotally connected to respective adjacent links, said links together forming an endless belt which is guided and driven by drive wheels and guide-rollers or guide-wheels.

When a link becomes worn, or in any other way unserviceable, the invention provides means whereby said link can be readily replaced by a new link.

An object of the present invention is to eliminate the afore-mentioned disadvantages. To this end each link is provided at one end part thereof with a first part-cylindrical surface and at its other end with a further part-cylindrical surface, in which the diameter of one part-cylindrical surface exceeds the diameter of the other. The pivot-axes of the links shall lie on the centre of the part-cylindrical surfaces.

In addition, the end-part of one link shall co-act with an end-part of an adjacent link via a mechanical holder device which can be readily removed, so as break the connection between the respective mutually adjacent links.

Said mechanical holder devices for mutually adjacent links are arranged in the side portions of said links, leaving the front and rear portions of said links free. The drive wheel and/or guide wheel are formed with support surfaces intended to cooperate with the part-cylindrical surface of said link between the holder devices. Thus the distance between adjacent support surfaces is equal to the distance between the first and the second part-cylindrical surfaces.

ADVANTAGES

A conveyor belt constructed in accordance with the invention affords the advantage whereby the belt remains impermeable to the material conveyed thereon, irrespective of whether said material is granular or in lump form, while wear on the links are pivot-shafts will result in the end-parts of the links being progressively brought together, to maintain an imperforate conveying surface.

Because the links are of simple construction, manufacturing costs can be expected to be low, which means that a conveyor belt constructed in accordance with the invention can find application in fields where previously conveyor belts operating with a corresponding link principle have been prohibited because of their high production costs.

The particular construction and design of the links according to the invention also affords the advantage whereby the conveyor belt is able to convey goods at an angle greater than the actual repose angle of the goods in question. The belt is also self-supporting.

In addition, the present construction provides the possibility of readily dismantling one or more links through simple holder devices, and to replace said links with new links.

Further it is an object of the conveyor arrangement according to the present invention comprising a plurality of links, whose mutually opposite end parts are pivotally connected to the respective end parts of mutually adjacent links, said links together forming an endless path normally guided by drive wheel and guide wheel, each of said link being provided at one end part thereof with a first part-cylindrical surface and at its other end part with a second part-cylindrical surface, so that mutually adjacent links are fastened together by means of a mechanical holder device, that the drive wheel and/or the guide wheel having such a breadth that its support surfaces are extending only between said two mechanical devices and thus the drive wheel and/or the guide wheel may have a breadth less than that of the conveyor path or belt.

The prime object of the present invention is to fulfill the aforementioned desiderata. To this end there is provided in accordance with the invention a conveyor belt having the characteristic features of the accompanying main claim.

BRIEF DESCRIPTION OF THE DRAWINGS

A preferred embodiment of the invention will now be described in detail with reference to the accompanying schematic drawings, in which FIG. 1 is a perspective view of a conveyor belt constructed in accordance with the present invention;

FIG. 2 is a perspective view of a drive wheel for a conveyor belt, constructed of a plurality of links and utilized in the manner illustrated in FIG. 1;

FIG. 3 is a perspective view of a multiplicity of adjacent links with side walls mounted thereon;

FIG. 4 illustrates a first embodiment of a side-wall which can be removably mounted on a link;

FIG. 5 illustrates a second embodiment of a side wall which can be removably mounted on a link;

FIG. 6 is an exploded view of a mechanical holder device arranged to cooperate with adjacent links;

FIG. 7 is a sectional view taken on the line VII—VII in FIG. 3, illustrating that the link may be provided with ridges or corrugations; and FIG. 8 is a perspective view of a link without a side wall.

BEST MODES

Thus the invention relates to a conveyor belt comprising a plurality of mutually, pivotally connected links. In FIG. 1 there is illustrated a short conveyor belt comprising a frame 1 which rests on a support 2 and the upper of which has the form of a loading pocket. A motor (not shown) is arranged to drive a wheel 4 cooperating with a belt 5 which also extends around a freely running wheel 6. The belt 5 is assumed to move in the direction of the arrow shown in FIG. 1. It will be understood, however, that the link construction is such as to enable the belt also to move in the other direction.

The belt 5 comprises a plurality of links whose mutually opposite end parts are pivotally mounted to the respective end parts of mutually adjacent links. In this way all the links together will form an endless belt guided by the drive wheel 4 and the guide roller or wheel 6. Subsequent to loading the belt 5 through the loading pocket 3 at a location 3a, the goods are conveyed through an opening 3a. Referring to FIG. 2, the drive wheel 4 comprises two end walls 15 and 15', and a plurality of rods 16 or tubes extending between said end walls. The wheel 6 is formed identical with the wheel 4. The rods 16 cooperate with each link through collars 7g (FIG. 8).

Referring to FIG. 3, the links forming the belt 5 are identical to one another, and hence only links 7 and 8 will be described in detail.

Each link 7, 8 can be provided with a side wall 7', 8' to increase the loading capacity of the belt. The side walls overlap each other by about 50%.

The design of the links can be seen more clearly from FIG. 8. Each link, for example the link 7, is provided at one end part 7a thereof with a convex outer surface 7b of part-cylindrical configuration, and at its other end part 7c with a concave internal surface 7d also of part-cylindrical configuration. The diameter of the convex part-cylindrical surface shall coincide with the diameter of the concave part-cylindrical surface. That is illustrated in FIG. 8, where the two part-cylindrical surfaces are shown to have the diameter D1. The centre 7e of one pivot axis or shaft of the link 7 lies on the the centre of the part-cylindrical surface 7b, while the centre 7f of the other pivot axis or shaft lies on the centre of the part-cylindrical surface 7d.

According to the embodiment, the surface 7d may have a larger diameter than the surface 7b. The part-cylindrical surface 7d shall then have a diameter which exceeds the smaller diameter by at most twice the thickness of the link. In the latter case it is assumed that a friction-reducing insert is arranged in a space between the part-cylindrical surface 7b of link 7 and the part-cylindrical surface of 8c of link 8. The friction-reducing insert, which may comprise polytetrafluoroethylene (PTEF) is not illustrated and will not be described.

If it is assumed that a given plane is oriented through the centres 7e and 7f of the link 7, the first part-cylindrical surface 7b shall begin within an angular range of 45°–180°, preferably within a range of 90°–130°. The other part-cylindrical surface 7d should begin in the proximity of said plane.

According to the embodiment of the belt of FIG. 3, each of the two mutually opposite side parts of the link shall be provided with a side wall 8' and 8" having two openings through which said walls cooperate with said link. The openings are referenced 8a and 8b (FIG. 4). The side walls can be removably attached to the link through a bolt-joint 8a' and 8b' (FIG. 3).

A link constructed in accordance with the invention has the advantage whereby the pressure exerted by the goods on the belt causes a horizontal pressure to be exerted on the pivot shaft 7e. When the belt is driven in the direction of the arrow shown in FIG. 1, the tension forces act on the link in a direction such as to tend to draw the surfaces 7b and 8c together, so as to take up any play caused in the journals by wear, thereby ensuring a satisfactorily sealed surface against the penetration of goods through the belt.

The aforementioned friction-reducing insert shall be placed between the surfaces 7b and 8c.

As will be seen from FIG. 3, the side walls 8' and 8" are attached to the end surfaces of the link 8 by means of a bolt-and-nut arrangement 8a' and 8b', whereby the side walls 8' and 8" can be readily removed from the link 8.

FIG. 4 illustrates a special construction of a side wall. It should be mentioned here that the side walls are mirror images of one another, and hence only the side wall 8' will be described in detail. The side wall 8' has a part 8c in which the holes 8a and 8b for mounting the side wall to the link 8 are arranged. Extending at right angles to the part 8c is a support part 8d. The side wall 8' has an edge piece 8e which is arranged to abut the planar surface of the link 7 when the links 7 and 8 are in a horizontal position, whereby the belt can be self-supporting over a long distance of the belt, without requiring the provision of supports on the underside of the belt. The side wall exhibits a straight upper part 8f.

FIG. 5 illustrates an alternative embodiment in which the upper part 8f of the side wall 8' is formed with a part 8g of semi-circular cross-section which part is arranged to embrace a correspondingly formed part on the side wall 7', whereby not only the edge part 8e serves to support the side walls, and therewith said distance of said belt, but also the mutually cooperating part-cylindrical part 8 on the respective side walls 7' and 8'.

The part 7b of link 7 and the part 8c of link 8 cooperate with one another in the manner shown in FIG. 6. The link-part 8c is provided with a hole 8k having a diameter corresponding to the diameter of a bolt 8m. Formed in the link 7 is a hole 7p whose diameter greatly exceeds the diameter of the hole 8k. Beneath the hole 7p there is arranged a collar 7g in which there is inserted a plastics sleeve 7h having a hole 7i of oval configuration extending co-axially there through. The bolt 8m passes through the hole 7i and through a washer 7k and two nuts 7m and 7m' are screwed onto the end of the bolt. Thus, by means of this arrangement, the part 8c is able to rotate relative to the part 7b, by movement of the bolt in the hole 7a of oval cross-section. In this way the two edges of respective links 7 and 8 are held together, while a link can readily be removed and replaced by another, simply by unscrewing the nuts 7m and 7m'.

FIG. 7 is a sectional view taken on the line VII—VII in FIG. 3. In the FIG. 7 embodiment the links have been provided with corrugations 8p. These corrugations are spaced a given distance apart and extend in the transport direction. It is thereby ensured that the link obtains a stable form. It is the intention of the present invention that mutually adjacent links have mutually opposing sliding corrugations so that they obtain thereby positive cooperation and orientation relative to one another.

The present invention refers to a conveyor arrangement, comprising a plurality of links, whose mutually opposite end parts are pivotally connected to the respective end parts of mutually adjacent links. Said links together forming an endless path normally guided by a drive wheel and a guide wheel. Each of said links being provided at one end part thereof with a first part-cylindrical surface and at its other end part with a second part-cylindrical surface, so that mutually adjacent links are fastened together by means of a mechanical holder device. Said mechanical holder devices 8m for mutually adjacent links 7, 8 are arranged in the side portions of said links leaving the front and rear portions of said links free. The drive wheel 4 and/or guide wheel 6 are formed with support surfaces intended to cooperate with the part-cylindrical surface of said link between the holder devices. The distance between adjacent support surfaces 16 is equal to the distance between the first and the second part-cylindrical surfaces.

Industrial use

The components of the conveyor according to the invention can be manufactured in series and can readily be assembled either in the factory or on site, depending on which is deemed most suitable.

The invention is not limited to the exemplary embodiments described above, but can be modified within the scope of the claims.

I claim:

1. A conveyor belt arrangement having a plurality of link members whose mutually opposite end parts are pivotally connected to the respective end parts of mutually adjacent link members, said link members together forming an endless path normally guided by a drive wheel and a guide wheel, said conveyor belt arrangement comprising:
    first wheel means for driving said endless path, and second wheel means for guiding said endless path, at least one of said first and second wheel means having a plurality of support surfaces, said support surfaces being separated from each other by a first distance;
    first and second mechanical holding means for pivotally connecting and holding mutually adjacent link members of said conveyor arrangement; and
    first and second link members, said first and second link members forming at least a portion of said endless path, and each of said first and second link members including:
        a first end part having a convex outer surface, said convex outer surface having a part-cylindrical configuration, said part-cylindrical configuration having a longitudinal axis forming a first pivot axis of said link member;
        a second end part having a concave internal surface, said concave internal surface having a part-cylindrical configuration, said part-cylindrical configuration having a longitudinal axis forming a second pivot axis of said link member;
        a first side region including a first side portion of said first end part and including a first side portion of said second end part; and
        a second side region including a second side portion of said first end part and including a second side portion of said second end part;
        wherein said convex outer surface and said concave internal surface are separated from each other by said first distance; and
        wherein said first and second side regions include first, second, third and fourth receiving means for accommodating at least one of said first and second mechanical holding means, said first side portion of said first end part including said first receiving means; said second side portion of said first end part including said second receiving means; said first side portion of said second end part including said third receiving means; and said second side portion of said second end part including said fourth receiving means;
    wherein said first and second link members are arranged with respect to each other such that the convex outer surface of said second link member is disposed beneath said concave internal surface of said first link member;
    wherein said first mechanical holding means for pivotally connecting and holding mutually adjacent link members is accommodated by said first receiving means of said second link member and by said third receiving means of said first link member; and further wherein said second mechanical holding means for pivotally connecting and holding mutually adjacent link members is accommodated by said second receiving means of said second link member and by said fourth receiving means of said first link member; and wherein said plurality of support surfaces included on said at least one of said first and second wheel means cooperates with the region of the part-cylindrical configuration of the first end part of said second link member located between said first and said second receiving means.

2. The conveyor belt arrangement according to claim 1:

wherein each of said first and second link members includes an upper surface;

wherein each of said first and second link members further includes a side wall having a support surface; and further wherein the support surface of the side wall included in said first link member abuts the upper surface of said second link member when said upper surfaces of said first and second link members are in a horizontal position in order to form a self-supporting endless path structure.

3. The conveyor belt arrangement according to claim 1:

wherein said first and second receiving means each comprise a bushing member, said bushing member having a hole;

wherein said third and fourth receiving means each have a hole;

wherein said first and second mechanical holding means each comprise a bolt member and a nut member, said nut member being threadedly accommodatable on said bolt member;

wherein when said first and second link members are arranged with respect to each other such that the convex outer surface of said second link member is disposed beneath said concave internal surface of said first link member, said bolt member of said first mechanical holding means is accommodated by the hole included in the bushing member of said first receiving means of said second link member and by the hole included in the third receiving means of said first link member; and said bolt member of said second mechanical holding means is accommodated by the hole included in the bushing member of said second receiving means of said second link member and by the hole included in the fourth receiving means of said first link member; and further wherein the rotation of said link members about said first and second pivot axes is effected through movement of said bolt members in the holes of said bushing members.

4. The conveyor belt arrangement according to claim 3 wherein the hole included in the bushing member of each of said first and second receiving means has the form of a groove in order to permit movement of the accommodated bolt member in the conveying direction of the link members.

5. The conveyor belt arrangement according to claim 1 wherein each of said first and second link members includes a selectively removable side wall.

6. The conveyor belt arrangement according to claim 2 wherein each of said first and second link members includes a further surface which contributes in forming said self-supporting endless path structure.

7. The conveyor belt arrangement according to claim 1 wherein each of said first and second link members includes at least one corrugation, said corrugation extending in the conveying direction of said endless path.

8. The conveyor belt arrangement according to claim 1 wherein said plurality of support surfaces included on said at least one of said first and second wheel means comprises a plurality of rod members.

9. In a conveyor belt arrangement having a plurality of link members whose mutually opposite end parts are pivotally connected to the respective end parts of mutually adjacent link members, said link members together forming an endless path normally guided by a drive wheel and a guide wheel, at least one of said drive wheel and guide wheel having a plurality of rod members separated by a first distance, an endless path comprising:

first and second bolt members, each of said bolt members having a nut member threadedly engaged thereto; and first and second link members forming at least a portion of said endless path, each of said first and second link members including:

a first end part having a convex outer surface, said convex outer surface having a part-cylindrical configuration, said part-cylindrical configuration having a longitudinal axis forming a first pivot axis of said link member;

a second end part having a concave internal surface, said concave internal surface having a part-cylindrical configuration, said part-cylindrical configuration having a longitudinal axis forming a second pivot axis of said link member;

a first side region including a first side portion of said first end part and including a first side portion of said second end part;

a second side region including a second side portion of said first end part and including a second side portion of said second end part;

wherein said convex outer surface and said concave internal surface are separated from each other by said first distance;

wherein said first side portion of said second end part includes a first hole, and said second side portion of said second end part includes a second hole; said first side portion of said first end part includes a first bushing member having an oval hole, and said second side portion of said first end part includes a second bushing member having an oval hole, each of said oval holes having a major axis disposed in the conveying direction of said endless path;

wherein said first and second link members are arranged with respect to each other such that the convex outer surface of said second link member is disposed beneath said concave internal surface of said first link member;

wherein said first bolt member is accommodated by the oval hole of said first bushing member of said second link member and by said first hole of said first link member; and further wherein said second bolt member is accommodated by the oval hole of said second bushing member of said second link member and by said second hole of said first link member; and wherein said plurality of rod members of said at least one of said drive wheel and guide wheel cooperates with the second link member of said endless path at the first pivot axis of said second link member, rotation of said link members about said first and second pivot axes being effected through movement of said bolt members in said oval holes of said bushing members.

* * * * *